US012758043B2

(12) United States Patent
Draghetti

(10) Patent No.: US 12,758,043 B2
(45) Date of Patent: Oct. 13, 2026

(54) PAPER STRAW

(71) Applicant: I.M.A. INDUSTRIA MACCHINE AUTOMATICHE S.P.A., Ozzano dell'Emilia (IT)

(72) Inventor: Fiorenzo Draghetti, Ozzano Dell'Emilia (IT)

(73) Assignee: I.M.A. INDUSTRIA MACCHINE AUTOMATICHE S.P.A., Ozzano dell'emilia (IT)

( * ) Notice: Subject to any disclaimer, the term of this patent is extended or adjusted under 35 U.S.C. 154(b) by 512 days.

(21) Appl. No.: 17/437,038

(22) PCT Filed: Mar. 6, 2020

(86) PCT No.: PCT/IT2020/050053

§ 371 (c)(1),
(2) Date: Sep. 7, 2021

(87) PCT Pub. No.: WO2020/178873

PCT Pub. Date: Sep. 10, 2020

(65) Prior Publication Data

US 2022/0175165 A1 Jun. 9, 2022

(30) Foreign Application Priority Data

Mar. 6, 2019 (IT) ........................ 102019000003245
Apr. 24, 2019 (IT) ........................ 102019000006310

(51) Int. Cl.
*A47G 21/18* (2006.01)
*B31D 5/00* (2017.01)

(52) U.S. Cl.
CPC ......... *A47G 21/186* (2013.01); *B31D 5/0095* (2013.01); *A47G 2400/10* (2013.01)

(58) Field of Classification Search
CPC .. A47G 21/18; A47G 21/186; A47G 2400/10; B31D 5/0095
See application file for complete search history.

(56) References Cited

U.S. PATENT DOCUMENTS

| | | | | |
|---|---|---|---|---|
| 2,985,077 A | 5/1961 | Josef, V et al. | | |
| 3,438,578 A * | 4/1969 | Moyer | B29C 53/30 215/388 | |
| 7,147,007 B2 * | 12/2006 | Renaud | F24F 13/0218 138/119 | |
| 9,974,403 B1 | 5/2018 | O'Neill | | |
| 2020/0146483 A1 * | 5/2020 | Zhao | A47G 21/186 | |

FOREIGN PATENT DOCUMENTS

| | | |
|---|---|---|
| CA | 823 000 A | 9/1969 |
| EP | 1 631 425 A1 | 3/2006 |

OTHER PUBLICATIONS

International Search Report and Written Opinion for PCT/IT2020/050053, mailed Jul. 3, 2020.

* cited by examiner

*Primary Examiner* — Jason J Boeckmann
(74) *Attorney, Agent, or Firm* — Panitch Schwarze Belisario & Nadel LLP

(57) ABSTRACT

A foldable drinking straw made of paper developing along a longitudinal axis, and having a flexible shaped portion configured to allow a folding, one over the other, of two adjacent portions of the straw. The flexible shaped portion is defined by a plurality of depressions, disposed in succession along the longitudinal axis, and each made on a limited circumferential portion of the circular section of the straw.

10 Claims, 6 Drawing Sheets

PAPER STRAW

FIELD OF THE INVENTION

Embodiments described here concern a foldable drinking straw made of paper, and the corresponding production method.

BACKGROUND OF THE INVENTION

Plastic drinking straws are known, typically used in the food sector, with the aim of sipping drinks or beverages in general from containers, such as glasses, bottles, cardboard packages, for example in the shape of a parallelepiped, also known as "brik".

It is also known that some types of straws are of the foldable type, having a flexible shaped portion suitable to allow the end part of the straw to be folded on itself, substantially at 180°. Typically, this shape is of the bellows type, defined by a succession of annular ridges and throats that are concentric and coaxial to the longitudinal development of the straw, for example by grooves, indentations, variations in thickness, suitable to allow its folding.

In this context, in particular, it is known that often the straws in question are applied packaged on the face of the container. In these cases, it is necessary to obtain high folding angles, substantially at 180°, keeping the size of the straw small, so that it does not protrude beyond the bulk of the container.

It is also known that the plastic with which the straws in question are made, by virtue of the intrinsic processing properties of the plastic material itself, allows to obtain the structural characteristics required by the straws, and in particular by the flexible shaped portion of the straws with relative ease.

However, plastic straws also have numerous disadvantages related, above all, to pollution and the poor biodegradability of plastic.

For this reason, a more eco-sustainable alternative to plastic straws is represented by paper straws.

There are known methods to make tubular bodies made of paper or cardboard, based on the spiral winding of one or more paper strips or filaments (filament winding). This manufacturing technique can be used to manufacture cylindrical bodies by spiral winding the paper filaments under tension around a rotating element, for example a mandrel, with the provision of one or more intermediate layers of glue (gumming operation), for the purposes of structural stability, as well as with at least a partial function of waterproofing. For example, patent document EP-B-1.631.425 describes an apparatus to produce tubular bodies from strips which are helically wound around a mandrel.

Another technique that can be used consists in winding two sheets of paper around a longitudinal axis, superimposing them longitudinally along the edges, where they are glued.

In this context, for the production of foldable paper straws, making the flexible shaped portion for the 180° folding represents a challenge, made complex also by the particular nature of the material used, since paper offers a remarkable mechanical resistance to possible processes.

For example, from patent documents U.S. Pat. Nos. 2,985,077 and 9,974,403 foldable drinking straws made of paper are known in which the flexible shaped portion is defined by a succession of circumferential annular throats, each of which allowing an angular excursion of a certain interval.

However, one drawback of these known solutions is that, by defining high radii of curvature, they do not allow a folding of the terminal part of the straw by 180° on itself, unless a very long flexible shaped portion is provided and therefore not compatible with the practical and industrial needs in question, for example for small drinking straws, for example straws for "brik" type containers.

There is therefore the need to perfect a straw that can overcome at least one of the disadvantages of the state of the art.

In particular, one purpose of the present invention is to provide a foldable paper straw which allows to obtain high values of folding angles, preferably also of 180°, while keeping the length of the flexible shaped portion short.

It is also a purpose of the present invention to provide a foldable paper straw which can allow to reach such high values of folding angles without thereby compromising its structural mechanical characteristics, as well as its characteristics of seal with respect to liquids.

Another purpose of the present invention is to provide foldable paper straws which can completely replace known foldable plastic straws.

Another purpose of the present invention is to provide a method which allows to produce foldable paper straws in a simple and efficient manner.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, the present invention concerns a foldable drinking straw made of paper with circular section and developing along a longitudinal axis, comprising a flexible shaped portion.

The flexible shaped portion is configured to allow a folding, one over the other, of two adjacent portions of the straw.

The flexible shaped portion is defined by a plurality of depressions, disposed in succession and angularly offset along the longitudinal axis and each made, transversely to the longitudinal axis, on a limited circumferential portion of the circular section of the straw.

In some embodiments, the depressions are angularly offset with respect to longitudinally adjacent depressions.

According to some embodiments of the present invention, the flexible shaped portion comprises at least one group of depressions which consists of a first pair of depressions, made on a limited circumferential portion of the straw and aligned with each other in a direction parallel to the longitudinal axis, and a second pair of depressions interposed and angularly offset with respect to the two depressions of the first pair of depressions.

According to one aspect of the present invention, the plurality of depressions comprises groups of depressions, disposed along the longitudinal development of the flexible shaped portion and angularly offset with respect to each other.

Advantageously, the conformation, the depth and the number of the depressions can determine the direction of folding and the maximum value of possible angular excursion, which can be reached between the portions of the straw adjacent to the flexible shaped portion.

Advantageously, it is therefore possible to obtain high values of angular excursion between two adjacent portions of the straw, keeping the longitudinal development of the flexible shaped portion contained.

Embodiments that comprise one or more depressions made on a circumferential portion limited to a single side of the circular section of the straw can have a preferential direction of folding.

The present invention also concerns a method to produce a foldable drinking straw made of paper, with a circular section, that develops along a longitudinal axis.

The method comprises making, along a cylindrical tubular body of paper, a plurality of depressions disposed in succession and angularly offset along the longitudinal axis.

Each depression is made, transversely to the longitudinal axis, on a limited circumferential portion of the circular section of the cylindrical tubular body of paper, defining the flexible shaped portion, configured to allow a folding, one over the other, of two adjacent portions of the straw.

BRIEF DESCRIPTION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1C:
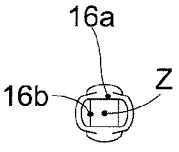
FIGS. 1*c* and 1*d* schematically show a straw in accordance with embodiments of the present invention, along the section AA' of FIGS. 1*a* and 1*b;*

We will now refer in detail to the various embodiments of the invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Embodiments described by means of the attached drawings concern a foldable drinking straw 10 made of paper with a circular section and developing along a longitudinal axis Z.

The straw 10 comprises a flexible shaped portion 13 configured to allow a folding, one over the other and advantageously of about 180°, of two adjacent portions 14, 15 of the straw 10.

The flexible shaped portion 13 is defined by a plurality of depressions 16 disposed in succession and angularly offset along the longitudinal axis Z and each made, transversely to the longitudinal axis Z, on a limited circumferential portion of the circular section of the straw 10.

With reference, for example, to FIGS. 1*a*, 1*b*, 7*a*, 7*b*, the straw 10 can consist of a single hollow tubular body, with an elongated and substantially cylindrical shape, wound around the longitudinal axis Z.

The straw 10 therefore has two ends, which for purely explanatory purposes can be indicated as upper end 12 and lower end 11.

In particular, the terms "upper" and "lower" must not be understood here in a limitative sense with respect to the functionality and/or conformation of the straw 10, which can be used in typical and familiar ways for products of this type.

In some embodiments of the present invention, the straw 10 is made of paper material, and in particular it can be made as a plurality of overlapping paper layers, or strips, for example in a spiral, or longitudinally.

In some embodiments, at least one of the overlapping paper layers, or strips, can be associated with an adhesive, that is, it can be gummed. The adhesive is able to provide structural and mechanical cohesion to the straw 10 as well as advantageously also waterproofness, at least for a desired period of time.

In some embodiments, the straw 10 can have an external diameter comprised between 2 and 20 mm, preferably between 4 and 10 mm.

In some embodiments, the straw 10 can have a thickness comprised between 0.2 and 0.5 mm.

In some embodiments, the straw 10 can have a length comprised between 100 and 400 mm.

An intermediate part of the longitudinal development of the straw 10, with a length variable according to requirements, has the flexible shaped portion 13.

The flexible shaped portion 13 defines the two adjacent portions 14, 15, of which for example a lower portion 14, substantially rigid, which extends between the flexible shaped portion 13 and the lower end 11, and an upper portion 15, substantially rigid, which extends between the flexible shaped portion 13 and the upper end 12.

In some embodiments, the flexible shaped portion 13 can be configured to allow the folding, one over the other, preferably by 180°, of the lower portion 14 and the upper portion 15, so that the fulcrum of the rotation is provided in the flexible shaped portion 13.

The straw 10, therefore, can assume an extended configuration, as shown by way of example in FIGS. 1*a*, 1*b*, 3, 4, 7*a*, 7*b*, wherein the upper portion 15 and the lower portion 14 are aligned with each other, that is, they define an angle of 180°, and angled configurations, in which the upper portion 15 and the lower portion 14 define variable angles.

Figure 2:
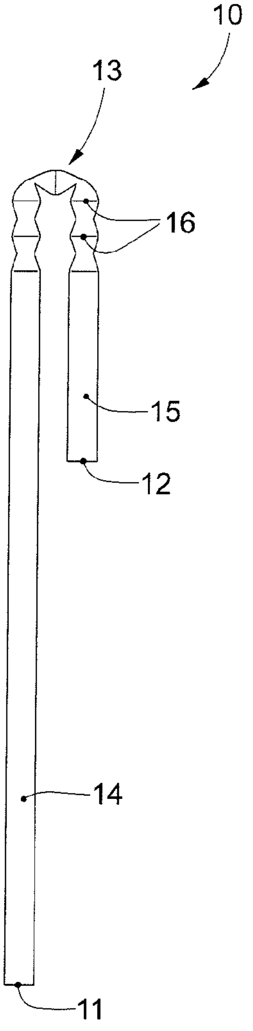
FIG. 2 shows a straw in a folded configuration, in accordance with embodiments of the present invention.

In embodiments described by means of FIG. 2, advantageous for example in the case of straws 10 used for "brik" type containers, the lower portion 14 and the upper portion 15 can rotate by a reciprocal angular excursion even of 180° in all directions.

In these cases, the straw 10 can also assume a folded configuration, in which the angle defined between the lower portion 14 and the upper portion 15 is, conceptually, 0°.

In some embodiments of the present invention, the characteristic that allows the flexible shaped portion 13 to act as a fulcrum for the reciprocal rotation between the lower portion 14 and the upper portion 15 is associated with the presence of the plurality of depressions 16.

In some embodiments, the depressions 16 can be configured as deformations of the surface of the straw 10, which result in a lowering of the level with respect to the average level of the surface in the surrounding region.

In some embodiments, the depressions 16 can be the result of the pressure of suitable contrast means, such as for example tips, blades, teeth, wedges, of variable shapes and sizes.

The conformation of the depressions 16 can determine the direction of folding between the lower portion 14 and the upper portion 15 of the straw 10.

For example, a depression 16 made on a circumferential portion limited to a single side of the circular section of the straw 10 can promote the folding of the straw 10 in a direction of folding defined by the side where the depression 16 is applied.

According to another example, the presence of two opposite depressions 16 can promote the folding of the straw 10 in two directions of folding, defined by the sides where the depressions 16 are applied.

Furthermore, the depth and the number of depressions 16 can determine the maximum value of possible angular excursion, which can be reached between the lower portion 14 and the upper portion 15 of the straw 10.

In particular, it is possible to increase the angular excursion value associated with each depression 16, increasing its depth.

Furthermore, the fact that the depressions 16 are angularly offset with respect to each other allows to weaken the paper material in correspondence with the flexible shaped portion 13, preventing the creation of break points, edges or excessive deformations, and allowing a controlled folding thereof.

In embodiments described by means of FIGS. 7*a*, 7*b*, 7*c*, 7*d*, 7*e* and 7*f*, the flexible shaped portion 13 comprises at least one group of depressions 16 which consists of a first pair of depressions 16*c*, made on a limited circumferential portion of the straw 10 and aligned with each other in a direction parallel to the longitudinal axis Z, and a second pair of depressions 16*d* interposed and angularly offset with respect to the two depressions of the first pair of depressions 16*c*.

The two depressions of the first pair of depressions 16*c* can be disposed on the same side of the straw 10 with respect to the longitudinal axis Z.

The two depressions of the second pair of depressions 16*d* can be opposite and aligned in a direction substantially orthogonal to the longitudinal axis Z.

In some embodiments, the two depressions of the second pair of depressions 16*d* are substantially offset by 90° with respect to the first pair of depressions 16*c*.

In the embodiments described by means of FIGS. 7*a*, 7*b*, 7*e* and 7*f*, since one side of the straw 10 is defined by the position of one of the depressions of the first pair of depressions 16*c* with respect to the longitudinal axis Z, the other of the depressions of the first pair of depressions 16*c* is disposed on the same side.

Furthermore, considering a longitudinal section of the flexible shaped portion 13 passing along the longitudinal axis Z and through the first pair of depressions 16*c*, the sections of the two depressions of the first pair of depressions 16*c* are disposed on the same side of the longitudinal section.

Furthermore, since another side of the straw 10 is defined by the position of one of the depressions of the second pair of depressions 16*d* with respect to the longitudinal axis Z, the other of the depressions of the second pair of depressions 16*c* is disposed on a side opposite the other side, with respect to the longitudinal axis Z.

In these embodiments, therefore, considering a longitudinal section of the flexible shaped portion 13 passing along the longitudinal axis Z and through the second pair of depressions 16*d*, the sections of the two depressions of the second pair of depressions 16*d* are disposed on opposite sides of the longitudinal section.

In these embodiments, the straw 10 can have a preferential direction of folding, defined by the side on which the first pair of depressions 16*c* is applied.

Figure 4:
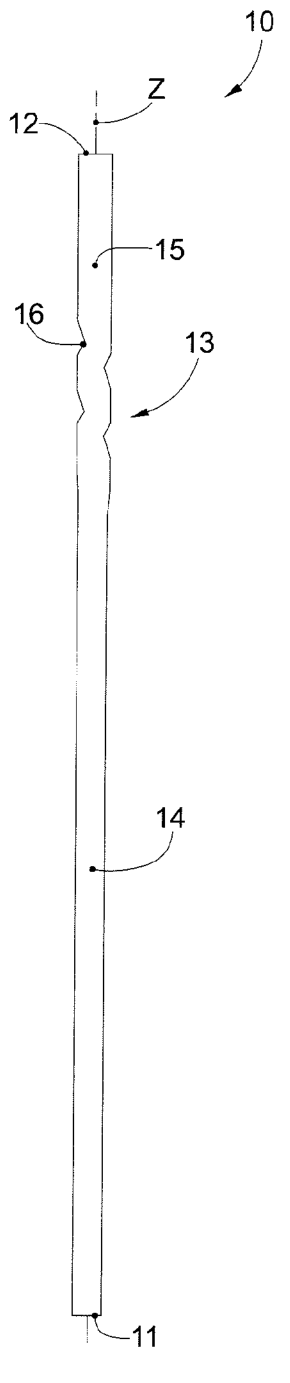
FIG. 4 schematically shows a straw in accordance with embodiments of the present invention.

Similarly, in embodiments described by means of FIG. 4, there are two depressions 16 for each side of the straw 10, disposed in succession along the longitudinal axis Z, angularly offset with respect to each other by about 180°, and each made on a circumferential portion limited to a single side of the circular section of the straw 10.

In these embodiments, the straw 10 can fold in two directions of folding, defined by the two sides on which the depressions 16 are applied.

In some embodiments, the plurality of depressions 16 is configured as groups of depressions 16, disposed along the longitudinal development of the flexible shaped portion 13, as shown by way of example in FIGS. 1*a*, 1*b*, 2, 3, 4.

In some embodiments, groups of depressions 16 are angularly offset with respect to longitudinally adjacent groups of depressions 16.

It is obvious that the groups of depressions 16 can comprise both depressions 16 made on a circumferential portion limited to a single side of the circular section of the straw 10, and also pairs of opposite depressions 16, as schematically shown in FIGS. 7*a*, 7*b*, 7*e* and 7*f*.

These embodiments can have a preferential direction of folding, determined by the depressions 16 made on a single side.

The Applicant has verified that high angular excursion values, for example of 180°, can be obtained by applying a minimum number of two groups of depressions along the longitudinal development of the flexible shaped portion 13, preferably three or four groups of depressions 16.

Advantageously, since the depressions 16 are made as deformations of the surface rather than as hollows in the thickness, they can have variable depth with respect to the average level of the surface of the straw 10, compatibly with the diameter of the straw 10, without thereby compromising the seal of the straw 10 itself against leakage of liquids.

One advantage of the present invention, compared to foldable paper straws of the state of the art, is therefore that it is possible to obtain high angular excursion values between the lower portion 14 and the upper portion 15, increasing the depth of the depressions 16 and keeping their number contained, and therefore keeping the longitudinal development of the flexible shaped portion 13 contained.

This advantage is particularly significant in cases where the straw 10 has to respect predetermined parameters concerning shapes, sizes and length, possibly contained, such as for example in the case of straws for "brik" type containers.

In embodiments described by means of FIGS. 1*a*, 1*b*, 1*c*, 1*d*, there are opposite pairs of depressions 16, angularly offset by 90° with respect to the longitudinally adjacent pairs of depressions 16.

Figure 1D:
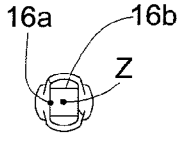

In particular, in the views shown in FIGS. 1*c*, 1*d* it is possible to observe in axial projection a pair of depressions 16*a* which is angularly offset by 90° with respect to a longitudinally adjacent pair of depressions 16*b*.

Figure 5:
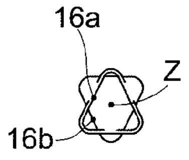
FIG. 5 is a schematic section view of a straw in accordance with embodiments of the present invention.

In other embodiments described as an example by means of FIG. 5, the groups of depressions 16 are groups of three depressions 16, for example applied at angular intervals of about 120° along the circumference of the straw 10.

In these embodiments, the groups of three depressions 16*a* can be angularly offset by about 60° with respect to the longitudinally adjacent groups of three depressions 16*b*.

Figure 6:
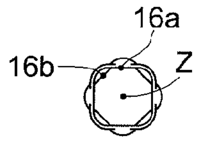
FIG. 6 is a schematic section view of a straw in accordance with embodiments of the present invention.
Figure 7C:
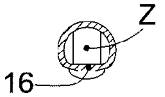
FIGS. 7*c* and 7*d* schematically show a portion of a straw in accordance with embodiments of the present invention, along the section BB' of FIGS. 7*a* and 7*b;*
Figure 7D:
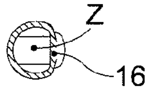
Figures 7A, 7B:
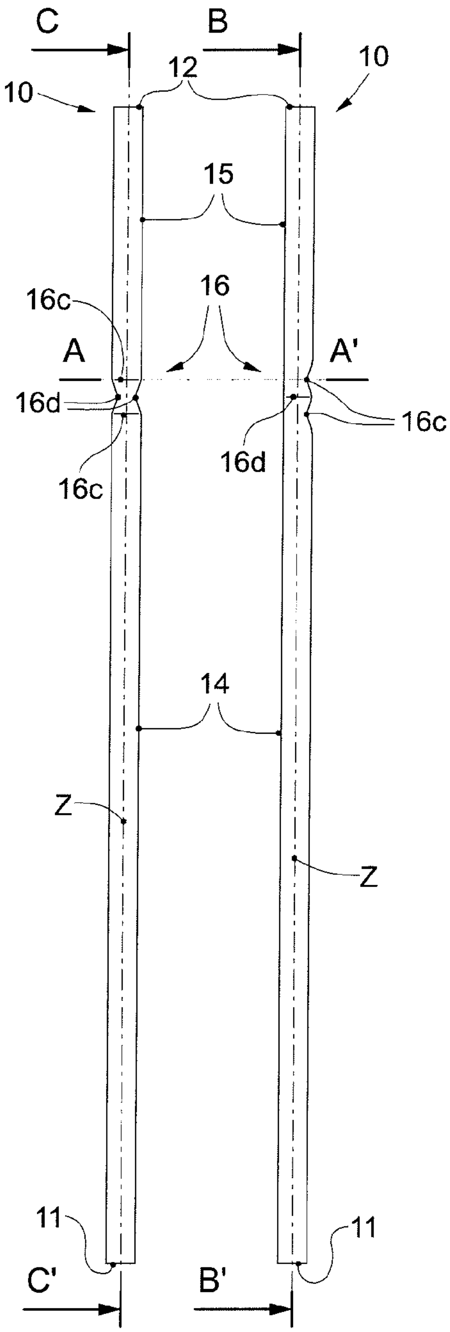
FIGS. 7*a* and 7*b* schematically show a straw in accordance with embodiments of the present invention.
Figures 7E, 7F:
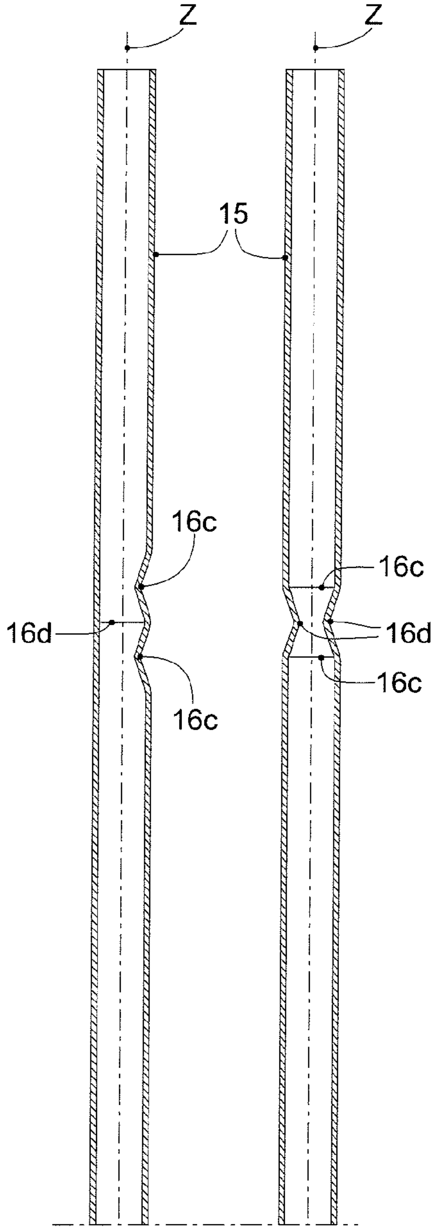
FIG. 7*e* schematically shows a portion of a straw in accordance with embodiments of the present invention, along the section CC' of FIG. 7*a;*
FIG. 7*f* schematically shows a portion of a straw in accordance with embodiments of the present invention, along the section DD' of FIG. 7*b;*
Figure 8:
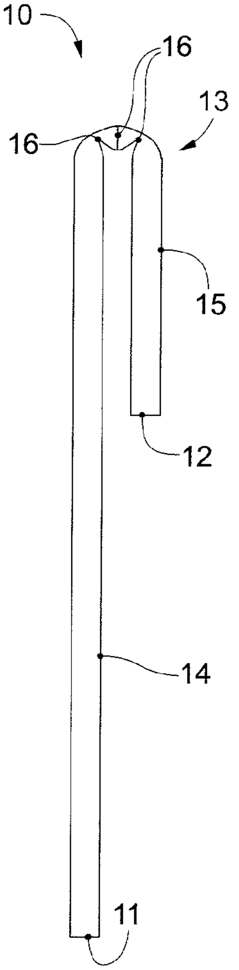
FIG. 8 schematically shows a portion of a portion of a straw in accordance with embodiments of the present invention.
Figures 1C, 1D:
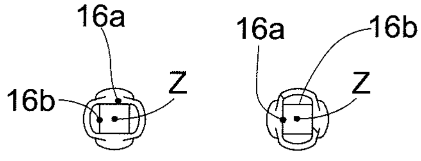
Figures 1A, 1B:
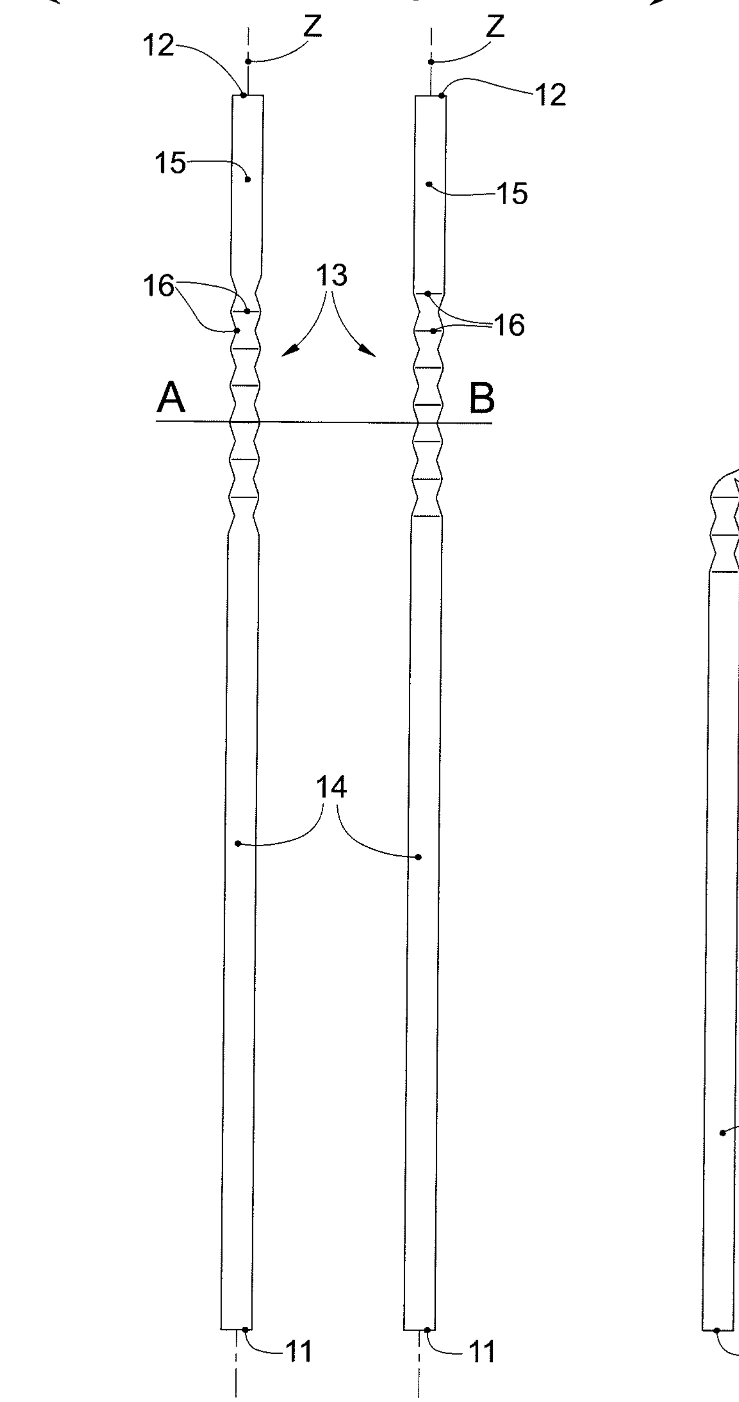
Figure 2:
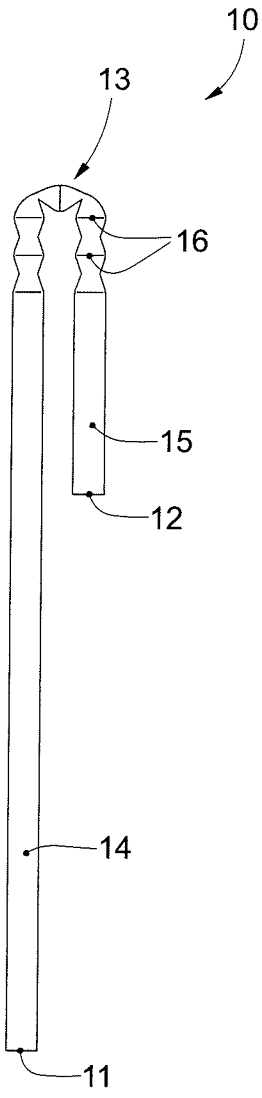
Figure 3:
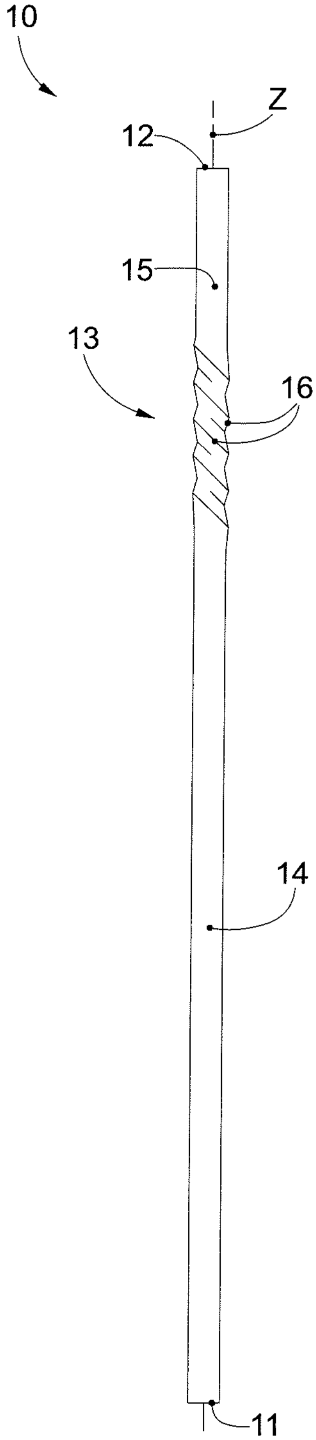
Figure 4:
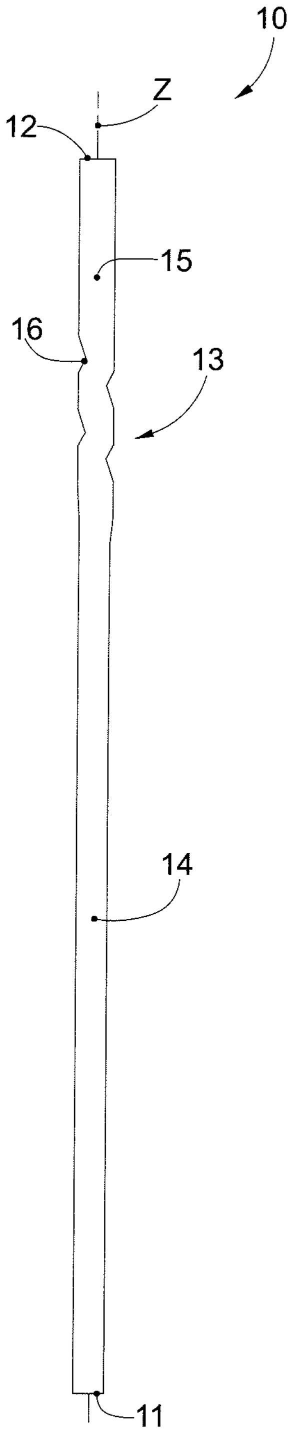
Figure 5:
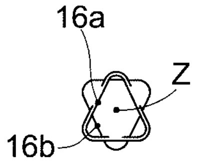
Figure 6:
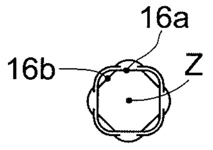
Figure 7C:
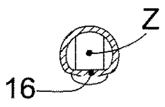
Figure 7D:
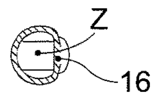
Figures 7A, 7B:
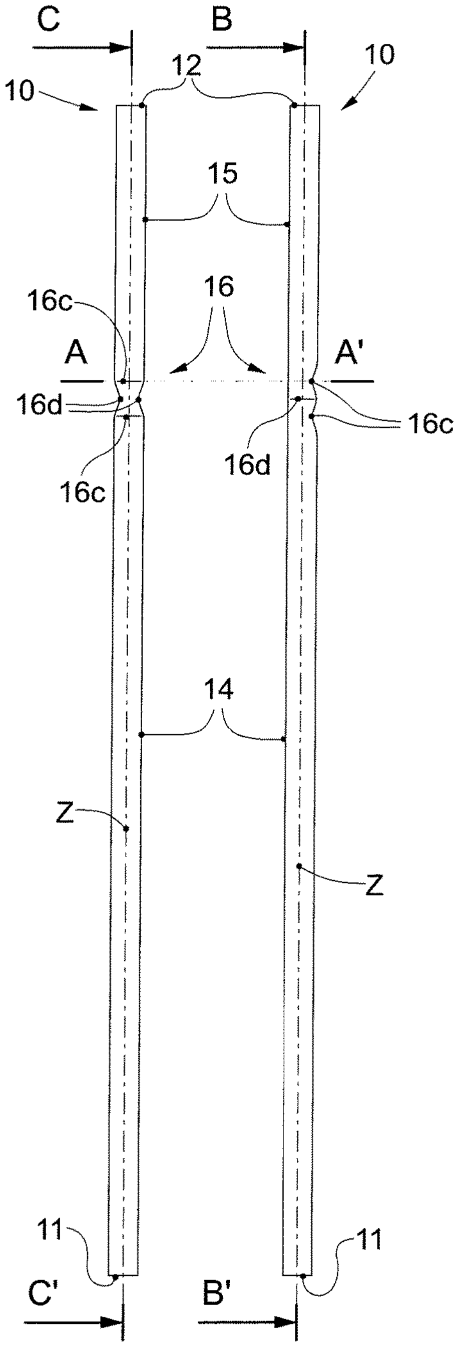
Figures 7E, 7F:
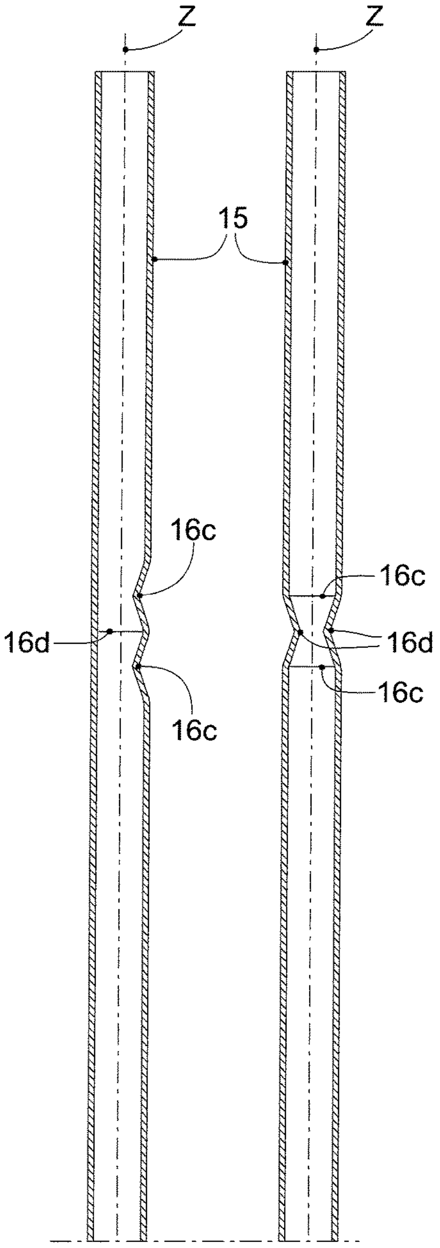
Figure 8:
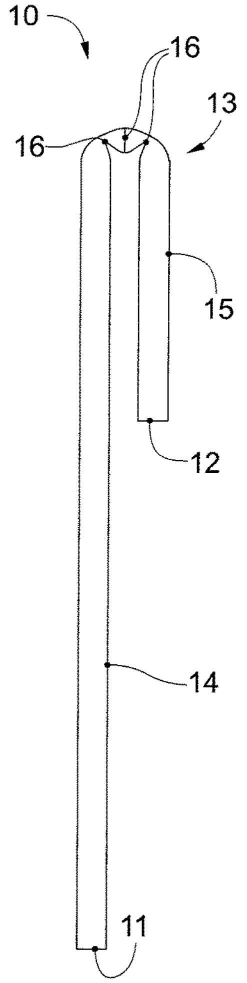

Other embodiments are also possible, described as an example by FIG. 6, in which the groups of depressions 16 are groups of four depressions, for example applied at angular intervals of about 90° along the circumference of the straw 10.

In these embodiments, the groups of four depressions 16*a* can be angularly offset by about 45° with respect to the longitudinally adjacent groups of four depressions 16*b*.

The depressions 16 can have developments of variable shapes and sizes, so that in the folding step, the cooperation between the developments of the depressions 16 disposed in succession and angularly offset along the longitudinal axis Z defines folding paths, or patterns, along which the flexible shaped portion 13 flexes, allowing the folding and/or reciprocal rotation of the lower portion 14 and upper portion 15.

Figures 1A, 1B:
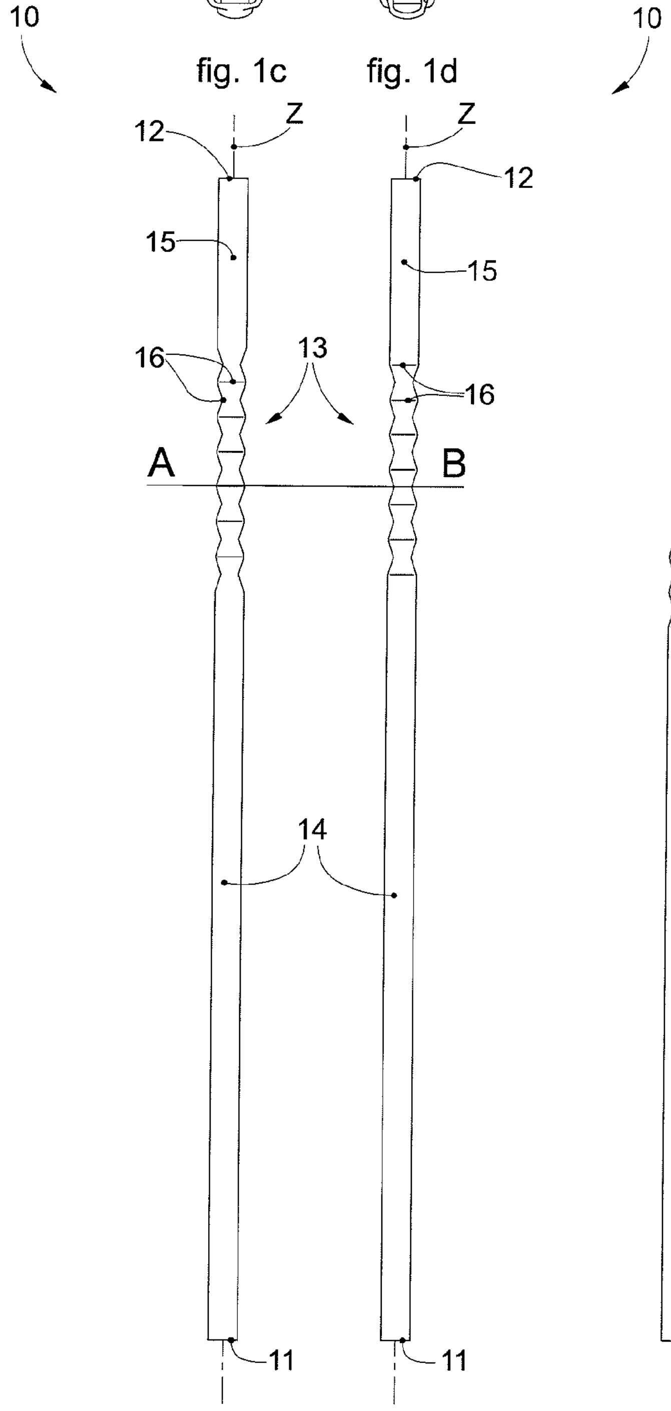
FIGS. 1*a* and 1*b* schematically show a straw in accordance with embodiments of the present invention.

In the embodiments described by FIGS. 1*a*, 1*b*, 2, each depression 16 has a rectilinear development, made on a circumferential portion of the straw 10, perpendicular with respect to the longitudinal axis Z.

Figure 3:
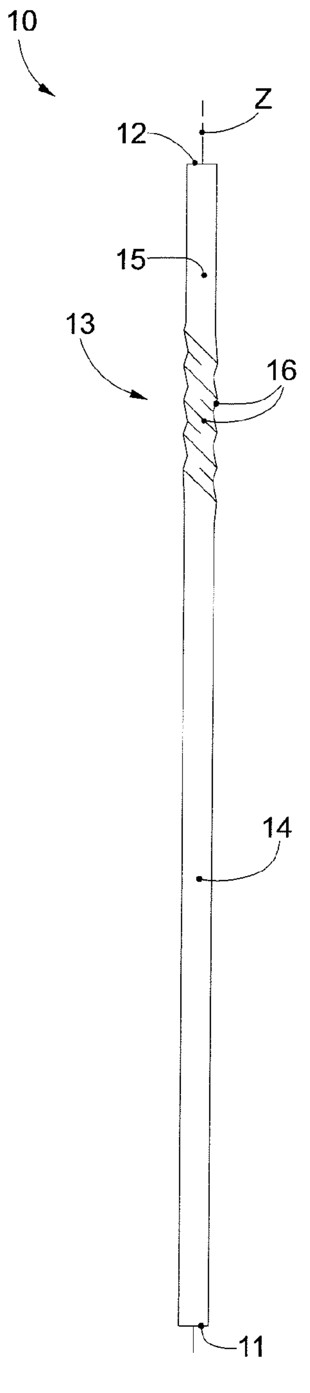
FIG. 3 schematically shows a straw in accordance with embodiments of the present invention.

Other embodiments, described by means of FIG. 3, provide that each depression has a rectilinear development, made on a circumferential portion of the straw 10, inclined with respect to the longitudinal axis Z, for example by an angle of inclination comprised between about 30° and about 60°.

In these embodiments, the cooperation between inclined developments of depressions 16 disposed angularly offset can generate folding paths, or patterns, of the helical type.

Other embodiments can also provide depressions 16 with non-rectilinear developments, for example arched or wedge-shaped.

It is obvious that the number, disposition, size and developments of the depressions 16 can be adjusted if necessary, for example based on the size of the straw 10, the desired folding angle values and/or on the basis of the sizes required for the straw 10.

In particular, straws 10 with larger circumferences can have a greater number of depressions 16 and/or depressions 16 of larger sizes.

The present invention also concerns a method to make a foldable drinking straw 10 made of paper, with a circular section and developing along a longitudinal axis Z.

The method of the present invention comprises the steps of:

- providing paper material in layers, or strips;
- winding the layers, or strips, of paper material, for example around a mandrel, so as to obtain a cylindrical tubular body of paper;
- making, along the cylindrical tubular body of paper, a plurality of depressions 16, disposed in succession and angularly offset along the longitudinal axis Z and each made, transversely to the longitudinal axis Z, on a limited circumferential portion of the circular section of the cylindrical tubular body of paper; this plurality of depressions therefore defines the flexible shaped portion 13 configured to allow the folding, one over the other, of two adjacent portions 14, 15 of the straw 10;
- cutting the hollow tubular body, so as to define the straw 10, that is, the upper end 12, the lower end 11, the upper portion 15, substantially rigid, the lower portion 14, substantially rigid, and the flexible shaped portion 13, comprised between the upper portion 15 and the lower portion 14 and defined by the region affected by the depressions 16.

In some embodiments, the method also comprises making, along the cylindrical tubular body of paper, at least one group of depressions 16, which consists of a first pair of depressions 16*c*, made on a limited circumferential portion of the straw 10 and aligned with each other in a direction parallel to the longitudinal axis Z, and a second pair of depressions 16*d* interposed and angularly offset with respect to the two depressions of the first pair of depressions 16*c*.

In some embodiments, the method also comprises making two depressions of the first pair of depressions 16*c* on the same side of the straw 10 with respect to the longitudinal axis Z.

In some embodiments, the method also comprises making the two depressions of the second pair of depressions 16*d* opposite and aligned in a direction substantially orthogonal to the longitudinal axis Z.

In some embodiments, the method also comprises making the two depressions of the second pair of depressions 16*d* offset substantially by 90° with respect to the first pair of depressions 16*a*.

In some embodiments, the winding of the layers, or strips, of paper material can be carried out by means of filament winding techniques and apparatuses.

In other embodiments, sheets or layers of paper can be wound around the longitudinal axis Z, overlapping and gluing the edges together.

In some embodiments, three layers, or strips, of paper material can be supplied, of which at least one, for example the intermediate layer, or strip, soaked in a glue suitable to guarantee cohesion to the layers, or to the strips, and seal to the straw 10.

In some embodiments, the innermost layer of paper material can only be soaked in glue on its external surface, so as to prevent the glue from coming into contact with the liquids passing through the straw 10.

It is clear that modifications and/or additions of parts or steps may be made to the straw 10 or to the method as described heretofore, without departing from the field and scope of the present invention.

It is also clear that, although the present invention has been described with reference to some specific examples, a person of skill in the art shall certainly be able to achieve many other equivalent forms of straw, having the characteristics as set forth in the claims and hence all coming within the field of protection defined thereby.

In the following claims, the sole purpose of the references in brackets is to facilitate reading and they must not be considered as restrictive factors with regard to the field of protection claimed in the specific claims.

The invention claimed is:

1. A paper drinking straw foldable up to 180°, comprising:

a circular section extending along a longitudinal axis, having a flexible portion configured to allow a folding, one over the other, of two adjacent portions of the straw, said flexible portion having a plurality of longitudinally spaced levels of depressions, each individual level of depressions having a maximum of two discrete depressions, wherein each depression is radially inwardly directed relative to a circumferential periphery of the circular section and is formed out of a limited segment of a respective circumferential portion of the circular section, whereby each level of depressions comprises at least one of said depressions and at least one undeformed segment of the circular section, and wherein each level of depressions is angularly offset by 90° relative to a longitudinally adjacent level of depressions.

2. A foldable drinking straw as in claim 1, wherein one level of depressions has two discrete depressions aligned with each other in a direction orthogonal to said longitudinal axis, and a longitudinally adjacent level of depressions has two discrete depressions.

3. A foldable drinking straw as in claim 2, wherein the two depressions of said longitudinally adjacent level of depressions are opposite and aligned in a direction substantially orthogonal to said longitudinal axis.

4. A foldable drinking straw as in claim 1, wherein each depression has a substantially rectilinear development perpendicular with respect to the longitudinal axis.

5. The paper drinking straw of claim 1, wherein the maximum of two discrete depressions per individual level occupies a maximum of 50% of the circumferential periphery of the corresponding circular section.

6. A method to make a paper drinking straw foldable up to 180°, comprising:

providing a cylindrical tubular body of paper including a circular section extending along a longitudinal axis, making, along the cylindrical tubular body of paper, a flexible portion having a plurality of longitudinally spaced levels of depressions, each individual level of depressions having a maximum of two discrete depressions, wherein each depression is radially inwardly directed relative to a circumferential periphery of the circular section and is formed out of a limited segment of a respective circumferential portion of the circular section, whereby each level of depressions comprises at least one of said depressions and at least one undeformed segment, and offsetting each level of depressions by 90° relative to a longitudinally adjacent level of depressions, such that the flexible portion is configured to allow a folding, one over the other, of two adjacent portions of the straw.

7. The method as in claim 6, which also comprises making one level of depressions with two discrete depressions aligned with each other in a direction orthogonal to said longitudinal axis, and making a longitudinally adjacent level of depressions with two discrete depressions.

8. The method as in claim 7, wherein the two depressions of said longitudinally adjacent level of depressions opposite and aligned in a direction substantially orthogonal to said longitudinal axis.

9. A foldable paper drinking straw comprising:

a circular section extending along a longitudinal axis, having a flexible portion configured to allow a folding, one over the other, of two adjacent portions of the straw, said flexible portion including a plurality of longitudinally spaced levels of depressions, each individual level of depressions having a maximum of two discrete depressions, wherein each depression is radially inwardly directed relative to a circumferential periphery of the circular section and is formed out of a limited segment of a respective circumferential portion of the circular section, whereby each level of depressions comprises at least one of said depressions and at least one undeformed segment of the circular section, and wherein each level of depressions is angularly offset relative to a longitudinally adjacent level of depressions such that each depression within a particular level of depressions does not angularly overlap with any depression of an adjacent level of depressions.

10. The paper drinking straw of claim 9, wherein the maximum of two discrete depressions per individual level occupies a maximum of 50% of the circumferential periphery of the corresponding circular section.

* * * * *